United States Patent
Kim et al.

(10) Patent No.: US 9,529,421 B2
(45) Date of Patent: Dec. 27, 2016

(54) SERVER FOR PHOTOGRAPHING APPARATUS AND METHOD OF PROVIDING STATUS NOTIFICATION OF PHOTOGRAPHING APPARATUS

(71) Applicant: SAMSUNG ELECTRONICS CO., LTD., Suwon-si, Gyeonggi-do (KR)

(72) Inventors: Jin-dong Kim, Uijeongbu-si (KR); Sung-ho Eun, Seoul (KR); Ki-deok Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 53 days.

(21) Appl. No.: 14/070,794

(22) Filed: Nov. 4, 2013

(65) Prior Publication Data
US 2014/0198224 A1 Jul. 17, 2014

(30) Foreign Application Priority Data
Jan. 16, 2013 (KR) .................. 10-2013-0005031

(51) Int. Cl.
*H04N 5/232* (2006.01)
*G06F 3/00* (2006.01)
*H04N 5/225* (2006.01)

(52) U.S. Cl.
CPC .............. *G06F 3/005* (2013.01); *H04N 5/225* (2013.01); *H04N 5/23206* (2013.01); *H04N 5/23241* (2013.01); *H04N 5/23222* (2013.01)

(58) Field of Classification Search
CPC .... H04N 5/232; H04N 5/225; H04N 5/23206; H04N 5/23241
See application file for complete search history.

(56) References Cited

U.S. PATENT DOCUMENTS

| | | | | |
|---|---|---|---|---|
| 8,690,062 B1* | 4/2014 | Qureshi | ............ | G06Q 10/1095 235/375 |
| 2001/0024232 A1* | 9/2001 | Suzuki | ............... | H04N 1/00204 348/207.99 |

(Continued)

FOREIGN PATENT DOCUMENTS

| | | | |
|---|---|---|---|
| GB | 2489572 A | | 10/2012 |
| JP | 2006-135722 | * | 5/2006 |

(Continued)

OTHER PUBLICATIONS

Extended European Search Report issued for related application EP 13192950.7, Dec. 1, 2015, 9 pages.

(Continued)

*Primary Examiner* — Adelaaziz Tissire
(74) *Attorney, Agent, or Firm* — Drinker Biddle & Reath LLP (57) ABSTRACT

A method for controlling a server connected to a photographing apparatus is provided. The control method includes receiving status information of the photographing apparatus from the photographing apparatus, searching a schedule for using the photographing apparatus from pre-stored scheduling information, determining whether the searched schedule and the status information of the photographing apparatus satisfy preset conditions, respectively, and transmitting notification information to a user terminal apparatus when the conditions are satisfied.

8 Claims, 10 Drawing Sheets

(56) References Cited

U.S. PATENT DOCUMENTS

| | | | |
|---|---|---|---|
| 2002/0053087 A1* | 5/2002 | Negishi | H04N 5/23206 725/99 |
| 2002/0072939 A1* | 6/2002 | Kawaberi | G06Q 10/02 705/5 |
| 2004/0056964 A1* | 3/2004 | Kawai | H04N 5/23206 348/211.1 |
| 2004/0177108 A1* | 9/2004 | Connelly | G06F 9/542 709/201 |
| 2006/0070105 A1* | 3/2006 | Kawai | H04N 5/23206 725/86 |
| 2006/0176364 A1* | 8/2006 | Lai | H04N 1/00307 348/14.01 |
| 2006/0187228 A1* | 8/2006 | Jung | G06F 3/1454 345/537 |
| 2008/0037826 A1* | 2/2008 | Sundstrom | G06F 17/30265 382/103 |
| 2008/0045173 A1* | 2/2008 | Park | G06Q 10/00 455/187.1 |
| 2008/0050111 A1* | 2/2008 | Lee | G03B 19/00 396/429 |
| 2008/0307243 A1* | 12/2008 | Lee | G06F 1/3203 713/320 |
| 2009/0059730 A1* | 3/2009 | Lyons | G04G 21/04 368/69 |
| 2009/0066529 A1* | 3/2009 | Fukada | G01R 31/3689 340/657 |
| 2009/0182608 A1* | 7/2009 | Tran | G06Q 10/06 718/102 |
| 2009/0187780 A1 | 7/2009 | Keohane et al. | |
| 2009/0327390 A1* | 12/2009 | Tran | G06F 9/4843 709/201 |
| 2011/0199511 A1 | 8/2011 | Takahashi et al. | |
| 2011/0205850 A1 | 8/2011 | Annambhotla et al. | |
| 2012/0329447 A1* | 12/2012 | Gilbert | H04M 1/72566 455/420 |
| 2014/0228062 A1* | 8/2014 | Rubowitz | H04W 52/0277 455/466 |

FOREIGN PATENT DOCUMENTS

| | | |
|---|---|---|
| JP | 2006-135722 A | 5/2006 |
| KR | 10-0780438 B1 | 11/2007 |
| KR | 10-2009-0067912 A | 6/2009 |

OTHER PUBLICATIONS

Office Action issued in related application KR 10-2013-0005031, Nov. 11, 2016, with English language translation, 8 pages.

* cited by examiner

(PHOTOGRAPHING APPARATUS)
CAMERA INFORMATION TRANSMISSION

410

| STATUS INFORMATION TRANSMISSION |
| :---: |
| ⦿ On   ○ Off |

420

| SETTING OF TRANSMISSION CYCLE | |
| :--- | :--- |
| ☑ LOW BATTERY LIFE/REMAINING MEMORY CAPACITY | 420a |
| ☐ IN POWER ON/OFF | 420b |
| ☑ IN SYSTEM ERROR OCCURRENCE | 420c |
| ☐ TRANSMISSION EVERY 5⇕ MINUTES | 420d |

SERVER FOR PHOTOGRAPHING APPARATUS AND METHOD OF PROVIDING STATUS NOTIFICATION OF PHOTOGRAPHING APPARATUS

CROSS-REFERENCE TO RELATED APPLICATION

This application claims priority from Korean Patent Application No. 10-2013-0005031, filed on Jan. 16, 2013, in the Korean Intellectual Property Office, the disclosure of which is incorporated herein by reference in its entirety.

BACKGROUND

1. Field

Apparatuses and methods consistent with exemplary embodiments relate to a server and a method of controlling the same, and more particularly, to a server which receives status information of a photographing apparatus, searches a user's schedule, and notifies the user of status information of the photographing apparatus in advance when a preset schedule is searched.

2. Related Art

Cameras in the related art have a main function to photograph and reproduce pictures, and provide a subsidiary function to transmit the photographed pictures or post the photographed pictures on a website through a network such as wireless fidelity (Wi-Fi).

On the other hand, unlike smart phones, cameras are not always carried by a user and are used only when there is a specific event. Therefore, since the status of the camera is not checked by the user, the battery may be dead or capacity of a memory card may be insufficient at an important moment when the user wishes to photograph a picture.

Further, since digital single-lens reflex cameras (DSLRs) have been recently developed to include various lenses and other accessories, the users have to select a lens or other accessories suitable for the photographing environments. However, it is not easy to obtain optimum results in the photographing environments in which beginners may have trouble handling the cameras.

In the related art, there is technology which allows the user to directly input a schedule for a target to be photographed by the user, a photographing time, and a photographing location into a photographing apparatus, and provides matters necessary for the photographing to the user in a text, voice, message, and the like, based on user-input information.

Further, there is technology for displaying information, such as a photographing location and a photographing time, when a corresponding image is selected by allowing the user-input information to be included in user-photographed image data.

However, in the related art, it is a cumbersome for a user to directly input scheduling information into the photographing apparatus. It is also inconvenient when the user is not notified in advance of a lack of remaining capacity of a battery or a memory card.

Therefore, there is a need for technology which determines a point of time for using the photographing apparatus without requiring the user to the direct input the user's schedule into the photographing apparatus, notifies the user of remaining battery life and remaining memory card capacity in advance, and notifies the user of a photographing accessory which may be used to obtain the optimum result from various accessories, such as a camera lens, an external strobe (flash), a battery grip, and a remote control, based on the photographing environments.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments are to provide a server which searches a user's schedule, notifies a user of status information of a photographing apparatus (e.g., remaining battery life, remaining memory card capacity) in advance when a special event is found, and provides information for a lens or other accessories suitable for a photographing environment, and a method of controlling the same.

According to an exemplary embodiment, a method of controlling a server connected to a photographing apparatus is provided. The method may include: receiving status information of the photographing apparatus from the photographing apparatus; searching a schedule for using the photographing apparatus from pre-stored scheduling information; determining whether the searched schedule and the status information of the photographing apparatus satisfy preset conditions, respectively; and transmitting notification information to a user terminal apparatus when the conditions are satisfied.

The status information of the photographing apparatus may include at least one of information for remaining battery life and information for storable memory capacity. The determining may include determining that the conditions are satisfied when an event found in the searched schedule is within a preset period of time and the at least one of the information for remaining battery life and the information for memory capacity is less than a preset threshold value.

The method may further include determining photographing environment information corresponding to the scheduling information. The transmitting of the notification information may include generating recommendation information for a photographing option of the photographing apparatus based on the photographing environment information corresponding to the searched schedule, and transmitting the notification information, including the recommendation information, to the user terminal apparatus.

The method may further include receiving and storing information of photographing accessories configured to attach to the photographing apparatus. The recommendation information may include recommendation information for at least one photographing accessory that matches the photographing environment information from the photographing accessories.

The pre-stored scheduling information may include scheduling information for the photographing apparatus received from a calendar connected to the server.

According to another exemplary embodiment, a server is provided. The server may include: a receiver that receives status information of a photographing apparatus from the photographing apparatus; a storage unit that stores scheduling information of a user; a controller that searches a schedule for using the photographing apparatus from the scheduling information of the user, and determines whether the searched schedule and the status information of the photographing apparatus satisfy preset conditions, respectively; and a transmitter that transmits notification information to a user terminal apparatus when the conditions are satisfied.

The status information of the photographing apparatus may include at least one of information for remaining battery life and information for storable memory capacity. The controller may determine that the conditions are satisfied when an event found in the searched schedule is within a preset period of time and the at least one of the information for remaining battery life and the information for memory capacity is less than a preset threshold value.

The controller of the server may determine photographing environment information corresponding to the scheduling information, and generate recommendation information for a photographing option of the photographing apparatus based on the photographing environment information corresponding to the searched schedule. The transmitter may transmit the notification information, including the recommendation information, to the user terminal apparatus.

The storage unit of the server may receive and store information of photographing accessories configured to attach to the photographing apparatus. The recommendation information may include recommendation information for at least one photographing accessory that matches the photographing environment information from the photographing accessories.

The pre-stored scheduling information may include scheduling information for the photographing apparatus received from a calendar connected to the server.

According to various exemplary embodiments, information such as the current remaining battery life and remaining memory capacity of a camera, a recommended lens, time-based photographing environments of a place registered in a calendar is provided in advance based on the user's schedule. Because the user is notified of the problems in advance, the user may take appropriate steps to correct the problems, and the availability of the camera for use at a scheduled event is high.

Additional aspects and advantages of the exemplary embodiments will be set forth in the detailed description, will be apparent from the detailed description, or may be learned by practicing the exemplary embodiments.

BRIEF DESCRIPTION OF THE DRAWINGS

The above and/or other aspects will be more apparent by describing in detail the exemplary embodiments, with reference to the accompanying drawings, in which.

DETAILED DESCRIPTION

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the art are not described in detail since they would obscure the exemplary embodiments with unnecessary detail.

Figure 1:
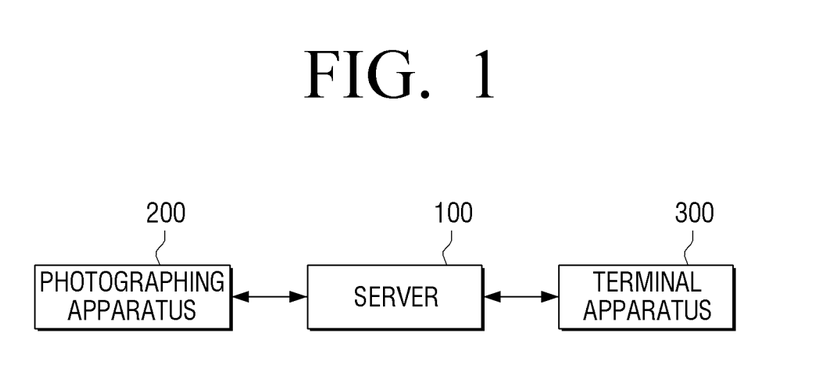
FIG. 1 is a block diagram illustrating a system that provides information of a photographing apparatus, according to an exemplary embodiment.

FIG. 1 is a block diagram illustrating a system that provides information of a photographing apparatus, according to an exemplary embodiment. As illustrated in FIG. 1, a system that provides information of a photographing apparatus includes a server 100, a photographing apparatus 200, and a user terminal apparatus 300.

The photographing apparatus 200 may include, for example, a compact digital camera, a high-end digital camera, a hybrid digital camera, a DSLR, a digital single-lens translucent camera (DSLT) or a digital camcorder. However, the above examples should not be construed as limiting, and the photographing apparatus 200 may be implemented with various electronic apparatuses.

The photographing apparatus 200 may be connected to the server 100 on a network and may transmit information of the photographing apparatus 200 to the server 100 whenever a preset event is generated.

The generation of the preset event may be any one of the following events: when a preset cycle has been reached, when remaining battery life or remaining memory capacity of the photographing apparatus 200 is less than a preset threshold value, and when an error occurs in a system of the photographing apparatus 200.

Further, the information transmitted to the server 100 from the photographing apparatus 200 may include at least one selected from the group consisting of remaining battery life, remaining memory capacity, accessories compatible with the photographing apparatus, the number of available photographs, and occurrence/non-occurrence of an error.

The server 100 may search a schedule for using the photographing apparatus 200 from pre-stored scheduling information of a user, and determine whether or not an event found in the searched schedule and the status information of the photographing apparatus 200 satisfy preset conditions, respectively. At this time, the pre-stored scheduling information may be scheduling information input by the user through a direct access to the server 100 or scheduling information received from a calendar connected to the server 100.

The server 100 may transmit the information of the photographing apparatus 200 or the photographing accessories to the user terminal apparatus 300 when the use of the photographing apparatus 200 by the user is expected based on the received information.

For example, when an outing, a trip, or a special event found during the search of the user's schedule, the server 100 may transmit up-to-date information of the photographing apparatus 200 to the user terminal apparatus 300 one day before a corresponding date of the event or within a period of time set by the user. Since the information of the photographing apparatus 200 includes the remaining battery life, remaining memory capacity, and occurrence/non-occurrence of a system error, and the user is notified of the information in advance to using the photographing apparatus 200, various problems that may prevent the user from using the photographing apparatus 200 (e.g., low battery life, low memory capacity, or the system error of the photographing apparatus 200) may be corrected before the special event.

The server 100 may receive and store information about the photographing accessories used by the user. Specifically, the server 100 may store registration identifications (IDs) of users, the corresponding ID of the photographing apparatus 200 held by the user, and an accessory list of the photographing apparatus 200. The accessories of the photographing apparatus 200 may include various lenses, a strobe (flash), a filter, a grip, a wired/wireless remote control, a tripod, a hood, and the like.

The server 100 may transmit time-based weather information of a corresponding date, lighting information, a sunset time, and other regional characteristics of a corresponding destination to the user, when "travel" or a trip is registered in the pre-stored scheduling information of the user and when the destination information is available.

Further, the server 100 may transmit information for camera set-up, a lens, and other accessories which may be used to obtain the best results based on the scheduling information of the user to the user terminal apparatus 300 before the start of the special event.

For example, when an outdoor event in the evening is found from the scheduling information of the user, the server 100 may transmit recommendation information for using a bright wide-angle lens, such as a standard-series single lens, and a strobe as the accessories of the photographing apparatus 200 to the user terminal apparatus 300 in advance. Alternatively, the server 100 may transmit information for a background or a photographing location, which may be used to obtain a good picture, in advance.

The server 100 may provide position information for the best photographing location for a travel destination found in the scheduling information of the user using pre-stored geographic and position information data.

As described above, when the server 100 receives the information of the photographing apparatus 200 from the photographing apparatus 200 and transmit the information to the user terminal apparatus 300 before the start of a specific event found from the scheduling information of the user, problems that may prevent the user from using the photographing apparatus 200 on a photographing day may be corrected in advance.

Further, since the information about the photographing option and the photographing accessories corresponding to the photographing environment information are transmitted in advance, the user may obtain the best photographing results.

Figure 2:
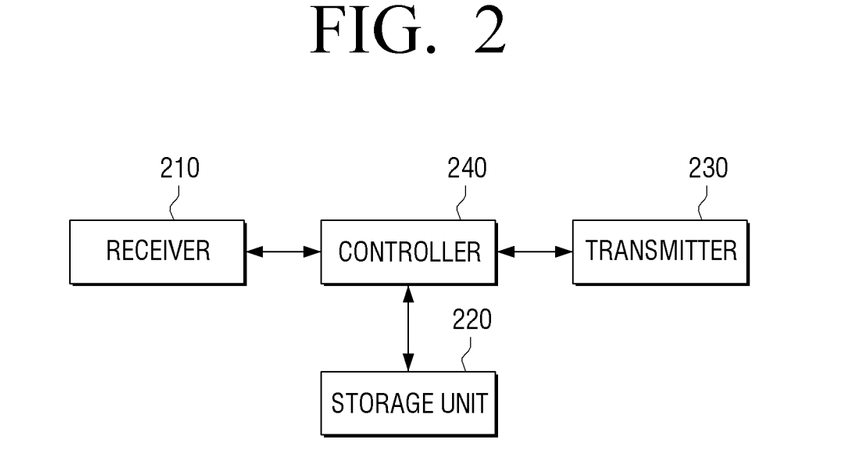
FIG. 2 is a block diagram illustrating a server, according to an exemplary embodiment.

FIG. 2 is a block diagram illustrating a server, according to an exemplary embodiment.

As illustrated in FIG. 2, the server 100 may include a receiver 210, a storage unit 220, a transmitter 230, and a controller 240.

The exemplary embodiment illustrates that the receiver 210 and the transmitter 230 are separate components. However, the receiver 210 and the transmitter 230 may be implemented in one component. The receiver 210 receives status information of the photographing apparatus 200 from the photographing apparatus 200.

The status information of the photographing apparatus 200 may include remaining battery life, remaining memory capacity, occurrence/non-occurrence of a system error in the photographing apparatus 200, and the like.

The receiver 210 may receive the status information of the photographing apparatus 200 when a cycle preset by the user has been reached, when the remaining battery life or remaining memory capacity of the photographing apparatus 200 is less than a preset threshold value, or when an error occurs in the system of the photographing apparatus 200.

The storage unit 220 stores scheduling information of the user.

The scheduling information of the user may be input by the user through user's direct access to a user scheduling management system provided by the server 100, or the scheduling information of the user may be received by the server 100 from a calendar connected to the server 100.

Further, the storage unit 220 may store a list of photographing accessories that may be used together with the photographing apparatus 200. The photographing accessories may include various lenses, a strobe (flash), a filter, a grip, a wired/wireless remote control, a tripod, a hood, and the like.

The user may access to the server 100 using a unique ID and may input the photographing apparatus 200 and the list of photographing accessories held by the user to the server. The user may input the schedule of the user to the user scheduling management system provided by the server 100.

In another exemplary embodiment, the user may access to the server 100 and set a calendar that is connected to the server 100. The calendar transmits the schedule of the user to the server 100 when the user input the schedule to the calendar.

The storage unit 220 may store geographic and position information, typically held by a manufacturer or obtained through partnership with other operators.

The geographic and position information pre-stored in the storage unit 220 may be used to determine a background or a photographing location which may be used to obtain the best photographing results.

As described above, the server 100 may store the scheduling information directly input by the user or transmitted from the calendar used by the user in the storage unit 220. The server 100 may transmit the status information of the photographing apparatus 200 to the user based on the scheduling information of the user stored in the storage unit 220 before the start of the scheduled event.

The transmitter 230 transmits notification information to the user terminal apparatus 300.

The notification information may include the remaining battery life, the remaining memory card capacity, occurrence/non-occurrence of a system error of the photographing apparatus 200, and the like.

For example, when the photographing apparatus 200 operates abnormally due to low battery life or low memory capacity, or due to the occurrence of an error in the system of the photographing apparatus 200, the server 100 may transmit the status information to the user and allow the user to take the necessary action in advance.

The user terminal apparatus 300 may include a mobile phone, a personal digital assistant (PDA), a smart phone, a user e-mail, and the like. The server 100 may transmit the status information of the photographing apparatus 200 as the notification information to the user through transmission of a text message or e-mail.

According to the exemplary embodiment, the server 100 may acquire the user information through the method in which the user accesses to the server 100 using a unique ID and then directly inputs a mobile phone number or e-mail information.

The controller 240 controls an overall operation of the server 100.

The controller 240 may control the receiver 210 to receive the status information of the photographing apparatus 200.

The received status information of the photographing apparatus 200 may include the remaining battery life, the remaining memory capacity, occurrence/non-occurrence of a system error, the number of available photographs, and the like.

The controller 240 may search the schedule for using the photographing apparatus 200 from the scheduling information pre-stored in the storage unit 220. The controller 240 may control the transmitter 230 to transmit the notification information to the user terminal apparatus 300, when an event found in the searched schedule and the status information of the photographing apparatus satisfy preset conditions, respectively.

Specifically, the controller 240 may determine that the event found in the searched schedule and the status information of the photographing apparatus 200 satisfy preset conditions when the event in which use of the photographing apparatus 300 is expected has arrived or when at least one of the remaining battery life and the remaining memory capacity is less than a preset threshold value. The controller 240 then controls the transmitter 230 to transmit the notification information to the user terminal apparatus 300.

For example, when the travel schedule on December 25 is found in the user's schedule, the controller 240 may control the transmitter 230 to transmit the status information of the photographing apparatus 200 to a portable phone or e-mail of the user three days before the start of the scheduled travel. Alternatively, when the remaining battery life or the remaining memory capacity is less than 10% of total capacity, the controller 240 may control the transmitter 230 to transmit the notification information to the user so that the user may charge the battery or ensure that the remaining memory capacity is sufficient.

In another exemplary embodiment, the controller 240 may generate recommendation information for camera setup or for photographing accessories, such as a lens, which may be used to obtain the best photographing results, based on information of the travel destination included in the scheduling information of the user.

The recommendation information may include information for the above-described photographing accessories and information for a background or a photographing location, which may be used to obtain a good picture.

For example, when the travel destination stored in the calendar of the user is outdoors and the time is after sunset, the controller 240 may recommend a bright wide-angle lens, such as a standard-series single lens, and a strobe. The controller 240 may further recommend white balance (WB) setting information, such as an aperture value based on a kind of lighting, a tungsten mode, a fluorescent light mode, or K temperature setting.

As described above, when the status information of the photographing apparatus 200 and the information for the travel destination are generated in advance and then sent to user based on the user's schedule, the user is reminded of the status information of the photographing apparatus 200 and the information for the photographing destination in advance. Thus, availability of the photographing apparatus 200 based on the user's schedule may be increased.

Further, various photographing techniques that are different from routine photographing techniques are introduced to beginner users, and thus the beginner users may obtain the best photographing results.

Figure 3:
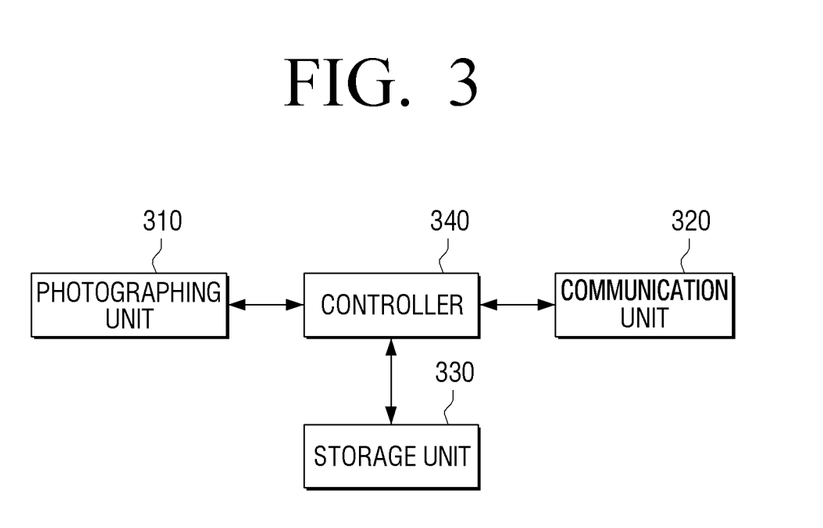
FIG. 3 is a block diagram illustrating a photographing apparatus, according to an exemplary embodiment.

FIG. 3 is a block diagram illustrating a photographing apparatus, according to an exemplary embodiment.

The photographing apparatus 200 according to the exemplary embodiment may include a photographing unit 310, a communication unit 320, a storage unit 330, and a controller 340.

The photographing unit 310 photographs a subject to acquire an image.

Specifically, the photographing unit 310 may include a lens (not shown) configured to acquire the image of the subject, a charge-coupled device (CCD) configured to convert an optical signal into an analog signal, and an analog/digital (A/D) converter (not shown) configured to convert the analog signal into a digital signal.

The communication unit 320 transmits information of the photographing apparatus 200 to the server 100.

The transmitted status information may include remaining battery life, memory card remaining capacity, occurrence/non-occurrence of a system error in the photographing apparatus 200, and the like.

The communication unit 320 may be implemented in a wired/wireless manner and may be implemented in a form of a universal serial bus (USB), Wi-Fi, Bluetooth, and the like.

The storage unit 330 stores the acquired image and the status information of the photographing apparatus 200. The storage unit 330 may be included in the photographing apparatus 200 or may be implemented as an external memory, such as an external memory card.

The storage unit 330 may store the acquired image from the photographing unit 310 and the status information of the photographing apparatus 200. Since the photographing apparatus 200 is not always placed in an environment that enables communication with the server 100, the photographing apparatus 200 may store the status information in the storage unit 330 and transmit the status information to the server 100 when the photographing apparatus 200 is connected to the server 100 in a wired/wireless manner.

The controller 340 controls an overall operation of the photographing apparatus 200.

The controller 340 may control the photographing unit 310 to acquire the image of the object when a photographing command is input by the user and control the photographing apparatus 200 to store the acquired image in the storage unit 330.

At this time, the acquire image is stored in the storage unit 330. Further, the controller 340 may recognize the status of the photographing apparatus 200 and store the status information of the photographing apparatus 200 in the storage unit 330.

The controller 340 transmits the status information of the photographing apparatus 200 to the server 100 when the photographing apparatus 200 is connected to the server 100 in a wired/wireless manner, when a time is preset by the user has arrived, or when the conditions are satisfied.

The transmitted status information may include various pieces of information of the photographing apparatus 200 pre-stored in the storage unit 330.

Figure 4:
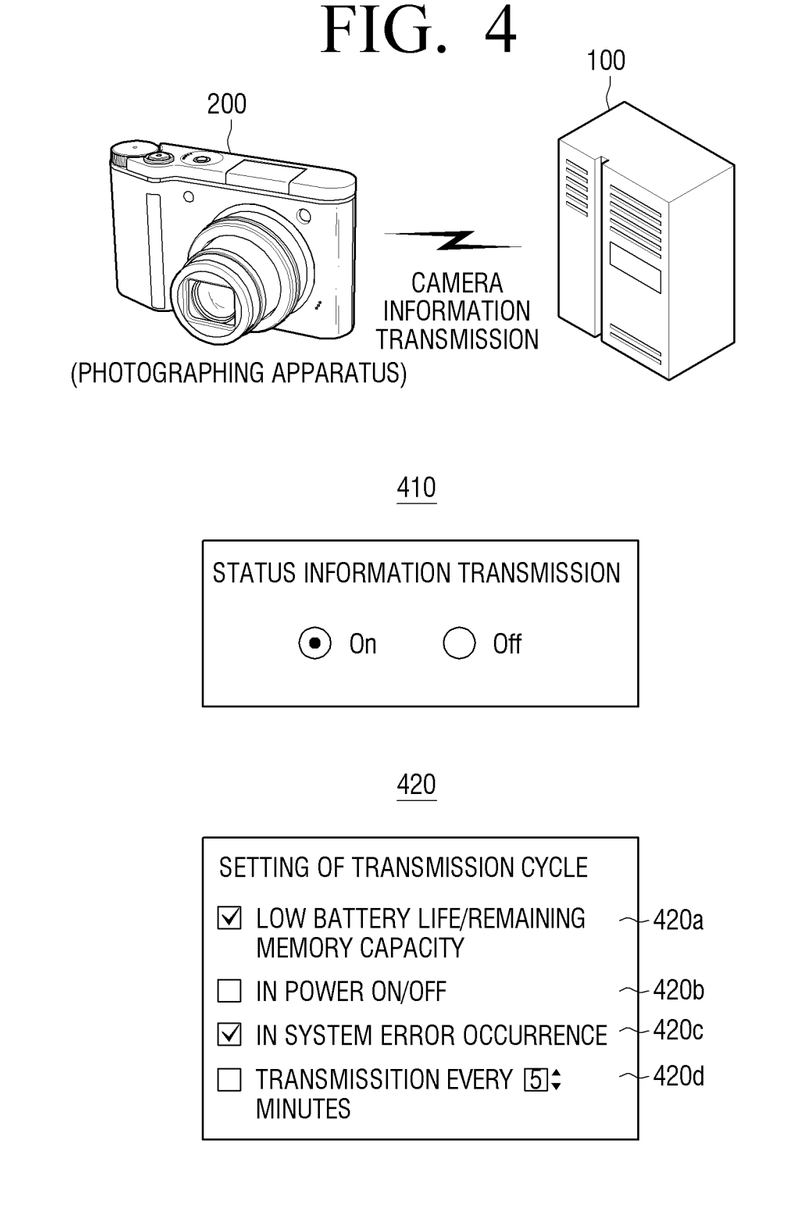
FIG. 4 is a diagram illustrating an operation of transmitting information of a photographing apparatus, according to an exemplary embodiment.

FIG. 4 is a diagram illustrating an operation of transmitting information of a photographing apparatus, according to an exemplary embodiment.

The photographing apparatus 200 transmits information of the photographing apparatus 200 to the server 100. At this time, the server 100 and the photographing apparatus 200 may be connected through a wired network (e.g., a USB cable) or through a wireless network (e.g., a wireless local area network (LAN), Wi-Fi, and Bluetooth).

In the exemplary embodiment, the server 100 and the photographing apparatus 200 are wirelessly connected.

The photographing apparatus 200 may be connected to the server 100 through a unique ID in a wired/wireless manner and may transmit up-to-date information of the photographing apparatus 200 to the server 100 when a preset event is generated.

The information of the photographing apparatus 200 transmitted to the server 100 may include information for remaining battery life, remaining memory capacity, and information for an error in the system of the photographing apparatus 200.

The preset event may include a case of power on/off, a case in which the remaining battery life or remaining memory capacity is less than a preset threshold value, or a case in which the time preset by the user has arrived.

The user may activate or deactivate the status information transmission function using a user interface (UI) window 410 provided on the photographing apparatus 200. When the photographing apparatus 200 is not connected to the server 100 in a wired/wireless manner (i.e., the photographing apparatus 200 may not transmit the status information of the photographing apparatus 200), the user may select "off" in the UI window 410 for deactivation of the status information transmission function so that the photographing apparatus 200 does not transmit the status information of the photographing apparatus 200 to the server 100.

Further, the user may set a point of time when the status information is transmitted to the server 100 from the photographing apparatus 200 through a UI window 420 for setting a transmission cycle.

The point of time when the information is transmitted from the photographing apparatus 200 to the server 100 may correspond to a low battery life or memory capacity (420*a*), power on/off of the photographing apparatus 200 (420*b*), occurrence of a system error (420*c*), and the start of a transmission cycle preset by the user (420*d*). The user may select a desired point of time in the UI window 420 for setting a transmission cycle.

Then, the server 100 may transmit the received information of the photographing apparatus 200 to the user terminal apparatus 300 based on the user's schedule.

For example, when an event found in the schedule is within a preset period of time or when at least one of the remaining battery life and the remaining memory capacity is less than a preset threshold value, the server may transmit the information of the photographing apparatus 200 to the user terminal apparatus 300.

On the other hand, since the server 100 transmits the information of the photographing apparatus 200 to the user based on the user's schedule, the server 100 requires information on the user's schedule. At this time, the server 100 may directly receive the schedule from the user or receive the scheduling information of the user from a calendar connected to the server 100.

Figure 5:
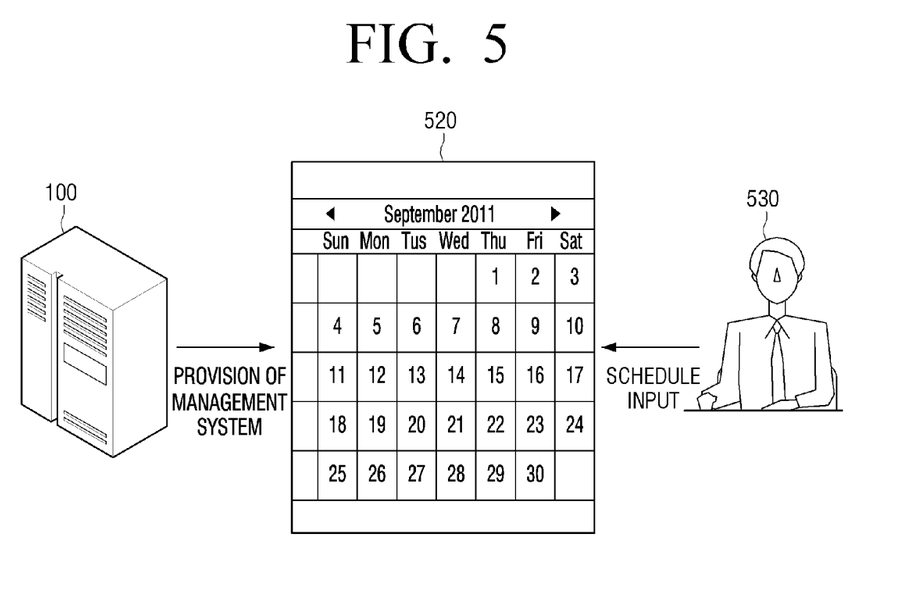
FIG. 5 is a diagram illustrating a method of directly inputting a schedule to a server by a user, according to an exemplary embodiment.

FIG. 5 is a diagram illustrating a method of directly inputting a schedule to a server by the user, according to an exemplary embodiment.

The server 100 may provide a user schedule management system 520 which may directly input the user's schedule by a user 530.

The user 530 may access to the server 100 using a unique ID to input a photographing apparatus 200 and a photographing accessory list held by the user. The user 530 may input the user's schedule to the user schedule management system 520 provided by the server 100.

The server 100 may search the received user's schedule for a special event and transmit the information of the photographing apparatus 200 to the user terminal apparatus 300 before the start of the special event.

At this time, when an error is present in the photographing apparatus 200, for example, when the remaining battery life or remaining memory capacity is less than a preset threshold value or when the photographing apparatus 200 is operating abnormally due to a system error, the server 100 may transmit the information of the photographing apparatus 200 to the user terminal apparatus 300. Alternatively, the server 100 may transmit the information of the photographing apparatus 100 to the user terminal apparatus 300 before the event found in the user's schedule has arrived, regardless of the status of the photographing apparatus 200.

When the server 100 transmits the information of the photographing apparatus 200 to the user before the start of the event, problems that may prevent a user from using the photographing apparatus 200 (e.g., lack of battery life or system error) at the time of the event may be corrected in advance.

Figure 6:
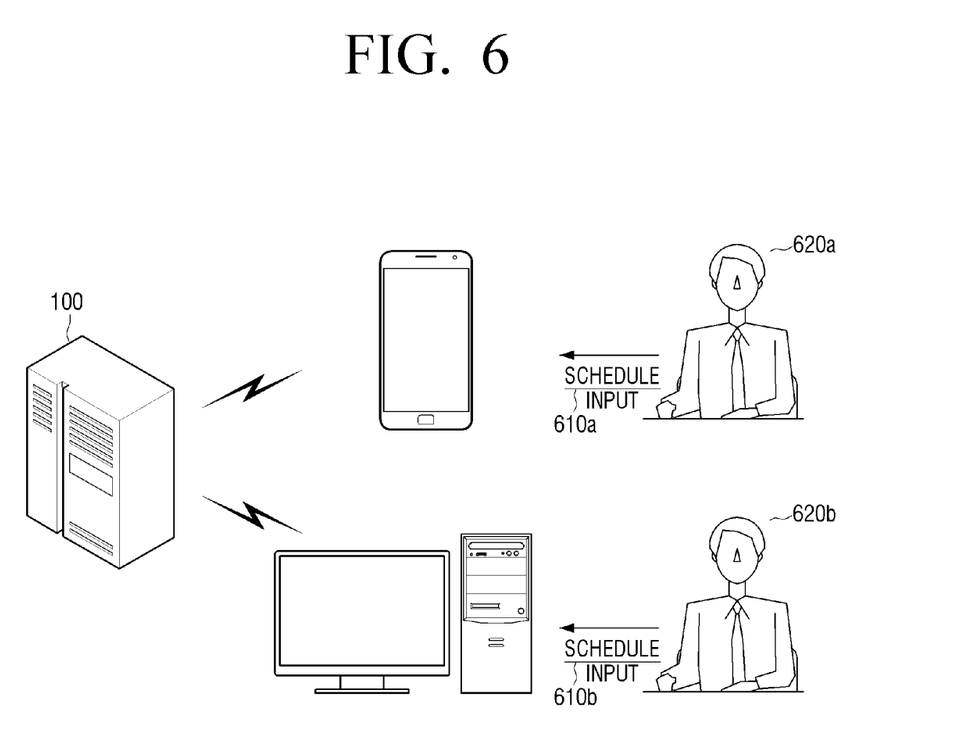
FIG. 6 is a diagram illustrating a method of searching a user's schedule by a server, according to another exemplary embodiment.

FIG. 6 is a diagram illustrating a method of searching a user's schedule by a server, according to an exemplary embodiment.

The server 100 may receive scheduling information of the user from a calendar of the user connected to the server online.

Users 620*a* and 620*b* may access to the server 100 using unique IDs to input information of the calendars 610*a* and 610*b* connected to the server 100 in advance.

Calendars 610*a* and 610*b* connected to the server 100 may be a calendar 610*a* of the user's 620*a* portable phone and a separate program 610*b* used by the user 620*b*.

When the users 620*a* and 620*b* input scheduling information into the calendars 610*a* and 610*b*, the calendars 610*a* and 610*b* transmit the scheduling information of the users 620*a* and 620*b* to the server 100. The server 100 may store the scheduling information of the users 620*a* and 620*b* to the storage unit 220, generate notification information based on the scheduling information of the users 620*a* and 620*b*, and transmit the notification information to the users 620*a* and 620*b*.

As described above, when the server 100 acquires the scheduling information of the users 620*a* and 620*b* connected to the calendars 610*a* and 610*b* used by the users 620*a* and 620*b*, the users 620*a* and 620*b* need not directly access the server 100 to input the scheduling information.

Figure 7:
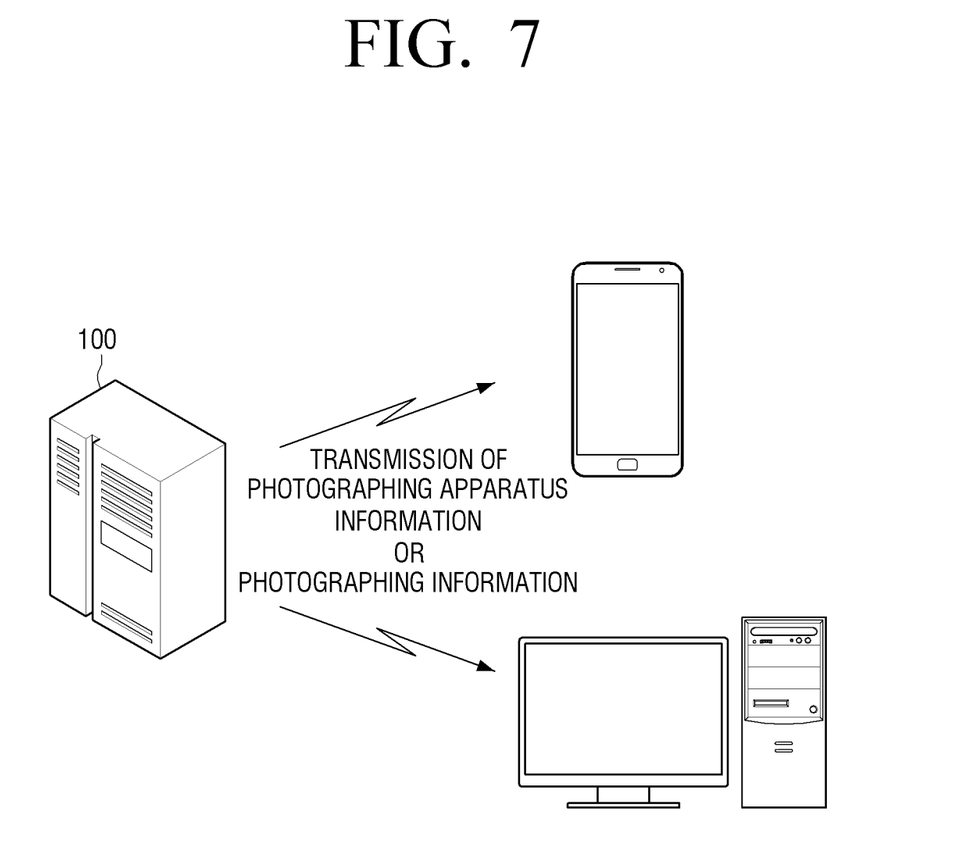
FIG. 7 is a diagram illustrating an operation of transmitting information of a photographing apparatus to a terminal apparatus from a server, according to an exemplary embodiment.

FIG. 7 is a diagram illustrating a method of transmitting information of a photographing apparatus 200 to a user terminal apparatus 300 from a server 100.

The server 100 may transmit information of the photographing apparatus 200 to the user terminal apparatus 300. The information of the photographing apparatus 200 may include remaining battery life, remaining memory card capacity, occurrence/non-occurrence of a system error, the number of available photographs, and the like.

The point of time when the server 100 transmits the information of the photographing apparatus 200 to the user terminal apparatus 300 may be preset by the user and may be set so that the user's schedule is searched in the user's calendar. The information of the photographing apparatus 200 may be transmitted several days before the start of a corresponding date of a found event.

Further, the point of time when the server 100 transmits the information of the photographing apparatus 200 to the user terminal apparatus 300 may be set so that the information of the photographing apparatus 200 is transmitted when the remaining battery life or remaining memory card capacity is less than a preset threshold value.

The server 100 may include information for photographing accessories, which may be used to obtain the best photographing results in a photographing location found in the calendar of the user, as well as the information of the photographing apparatus 200.

At this time, the user terminal apparatus 300 receiving the information of the photographing apparatus 200 may be a portable phone, a smart phone, a PDA, and the like, and the information may be transmitted in a text message. Further, the user terminal apparatus 300 may be a personal computer of the user and the information of the photographing apparatus 200 may be transmitted in an e-mail form.

Figure 8:
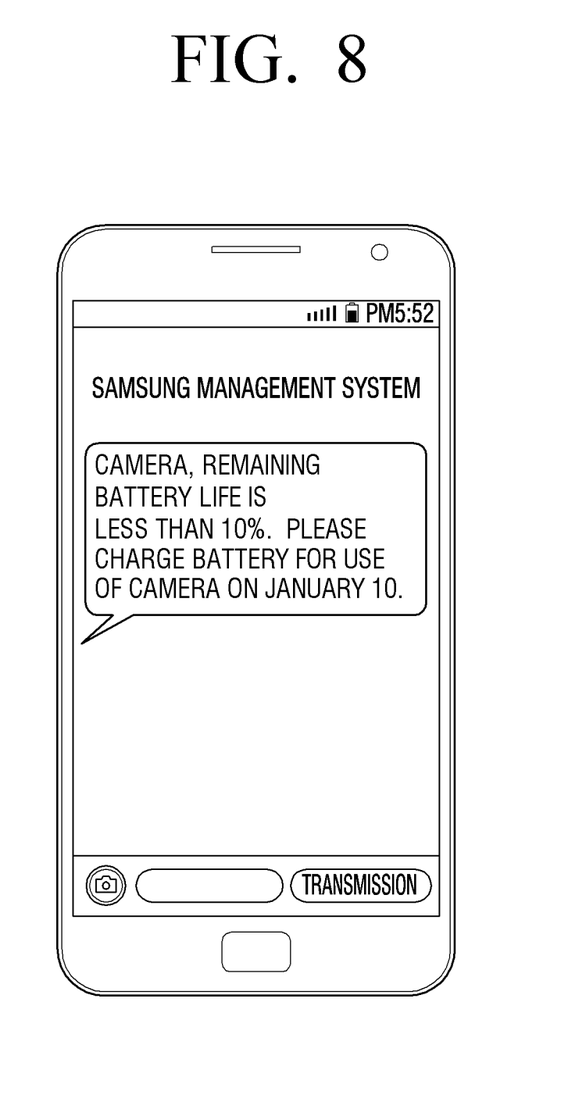
FIGS. 8 and 9 are diagrams illustrating notification information transmitted to a terminal apparatus, according to exemplary embodiments.
Figure 9:
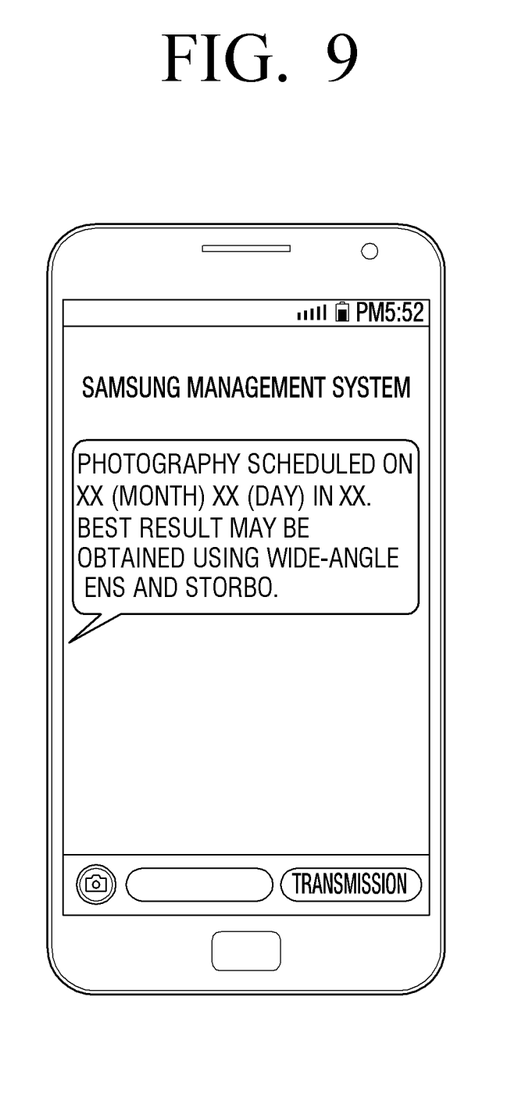

FIGS. 8 and 9 are diagrams illustrating notification information transmitted to a user terminal apparatus, according to exemplary embodiments.

FIG. 8 illustrates an example where the information of the photographing apparatus 200 is information for remaining battery life, and the schedule and the user terminal apparatus 300 is a smart phone. However, the example should not be construed as limiting, as the information of the photographing apparatus 200 may include other information of the photographing apparatus that may be transmitted to other terminal apparatuses 300.

In the exemplary embodiment, the remaining battery life of the photographing apparatus 200 is less than a threshold value (e.g., 10%) and the battery information of the photographing apparatus is transmitted to the user terminal apparatus 300. However, other information may also be transmitted.

For example, the transmitted information may include remaining memory card capacity, occurrence/non-occurrence of an error of the photographing apparatus 200, the number of available photographs, and the like, in addition to the remaining battery life of the photographing apparatus 200.

Further, the example illustrates that the remaining battery life is less than 10% of total battery capacity and the information of the remaining battery life is transmitted to the user terminal apparatus 300. However, the threshold value for the battery life may be preset by the user, and when the battery life falls below the threshold value preset by the user, the information of the remaining battery life may be transmitted to the user terminal apparatus 300.

FIG. 9 is a diagram illustrating information of a photographing location and photographing accessories transmitted to the user terminal apparatus 300.

The information transmitted to the user terminal apparatus 300 may include information such as camera set-up, lens, and accessories, which may be used obtain the best photographing results based on the user scheduling information pre-stored in the server 100.

For example, when an outdoor event is outdoors set in the evening is found in the scheduling information of the user, recommendation information for using of a bright wide-angle lens, such as a standard-series single lens, and a strobe as the accessories of the photographing apparatus 200 may be transmitted to the user terminal apparatus 300 in advance of the event. Further, information for a background or a photographing location which may result in a good picture may also be transmitted in advance.

The server 100 may provide position information for the taking the best photographs for a travel destination found in the user's schedule information using pre-stored geographic and position information data.

Figure 10:
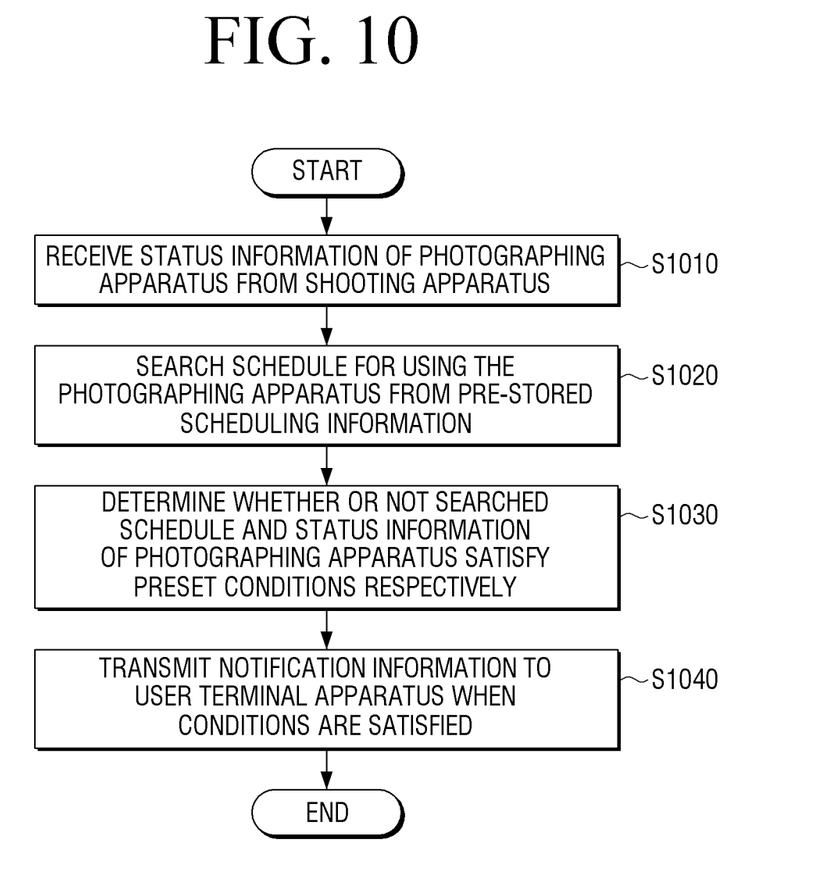
FIG. 10 is a flowchart illustrating a control method of a server, according to an exemplary embodiment.

FIG. 10 is a flowchart illustrating a control method of a server, according to an exemplary embodiment.

The server receives status information of the photographing apparatus 200 from the photographing apparatus 200 (S1010). At this time, the received status information of the photographing apparatus 200 may include remaining battery life, remaining memory card capacity, occurrence/non-occurrence of a system error of the photographing apparatus, the number of available photographs, and the like.

When the status information of the photographing apparatus 200 is received, the server 100 searches a schedule for using the photographing apparatus 200 from pre-stored scheduling information of the user (S1020). The scheduling information of the user may be input by the user after the user accesses to the server using a unique ID, or the information for the schedule may be received by the server 100 from a calendar of the user connected to the server 100.

Then, the server 100 may determine whether or not the searched schedule for using the photographing apparatus 200 and the status information of the photographing apparatus 200 satisfy preset conditions, respectively (S1030). At this time, the preset conditions may be, e.g., a case in which the remaining battery life or the remaining memory card capacity is less than a threshold value.

When the status of the photographing apparatus 200 satisfies the above-described conditions, the server 100 transmits the status information to the user terminal apparatus 300 (S1040).

As described above, when the server 100 receives the status information of the photographing apparatus 200 from the photographing apparatus 200 and then transmits the status information to the user terminal apparatus 300 before the start of the specific event found in the user's scheduling information, problems that may prevent the user from using the photographing apparatus 200 on a photographing day may be prevented in advance.

Since the information for the photographing option and the photographing accessories corresponding to the photographing environment information is transmitted in advance, the user may obtain the best photographing results.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A processor implemented method of controlling a server connected to a photographing apparatus, the method comprising the following operations that are performed by a processor:

receiving status information of the photographing apparatus from the photographing apparatus;

searching a schedule for using the photographing apparatus from pre-stored scheduling information;

determining whether the searched schedule and the status information of the photographing apparatus satisfy preset conditions, respectively;

determining photographing environment information corresponding to the scheduling information;

receiving and storing information of photographing accessories configured to attach to the photographing apparatus;

transmitting notification information to a user terminal apparatus at a predetermined time before a scheduled event when the conditions are satisfied, and wherein the transmitting of the notification information includes:
generating recommendation information for a photographing option of the photographing apparatus based on the photographing environment information corresponding to the searched schedule; and
transmitting the notification information, including the recommendation information, to the user terminal apparatus; and
wherein the recommendation information includes recommendation information for at least one photographing accessory that matches the photographing environment information from the photographing accessories.

2. The method as claimed in claim 1, wherein the status information of the photographing apparatus includes at least one of information for remaining battery life and information for storable memory capacity,
wherein the determining includes determining that the conditions are satisfied when an event found in the searched schedule is within a preset period of time and the at least one of the information for remaining battery life and the information for memory capacity is less than a preset threshold value.

3. The method as claimed in claim 1, wherein the prestored scheduling information includes scheduling information for using the photographing apparatus received from a calendar connected to the server.

4. The method as claimed in claim 1, wherein when a user-defined predetermined time has been set, the processor transmits notification information to the user terminal apparatus at the user-defined predetermined time before the scheduled event regardless of the status of the photographing apparatus.

5. A server comprising:
a receiver that receives status information of a photographing apparatus from the photographing apparatus;
a storage unit that stores scheduling information of a user;
a controller that searches a schedule for using the photographing apparatus from the scheduling information of the user, determines whether the searched schedule and the status information of the photographing apparatus satisfy preset conditions, respectively; and
a transmitter that:
transmits notification information to a user terminal apparatus at a predetermined time before a scheduled event when the conditions are satisfied, and
wherein the controller further determines photographing environment information corresponding to the scheduling information, and generates recommendation information for a photographing option of the photographing apparatus based on the photographing environment information corresponding to the searched schedule,
wherein the transmitter transmits the notification information, including the recommendation information, to the user terminal apparatus, and
wherein the storage unit receives and stores information of photographing accessories configured to attach to the photographing apparatus,
wherein the recommendation information includes recommendation information for at least one photographing accessory that matches the photographing environment information from the photographing accessories.

6. The server as claimed in claim 5, wherein the status information of the photographing apparatus includes at least one of information for remaining battery life and information for storable memory capacity,
wherein the controller determines that the conditions are satisfied when an event found in the searched schedule is within a preset period of time and the at least one of the information for remaining battery life and the information for memory capacity is less than a preset threshold value.

7. The server as claimed in claim 5, wherein the searched schedule information includes scheduling information for using the photographing apparatus received from a calendar connected to the server.

8. The server as claimed in claim 5, wherein when a use-defined predetermined time has been set, the transmitter transmits notification information to the user terminal apparatus at the user-defined predetermined time before the scheduled event regardless of the status of the photographing apparatus.

* * * * *